United States Patent [19]

Kastendieck

[11] Patent Number: 4,794,246

[45] Date of Patent: Dec. 27, 1988

[54] UNIVERSAL PASSIVE NIGHT VISION SYSTEM

[75] Inventor: William A. Kastendieck, Wylie, Tex.

[73] Assignee: Varo, Inc., Garland, Tex.

[21] Appl. No.: 72,109

[22] Filed: Jul. 10, 1987

[51] Int. Cl.4 .............................................. H01J 31/50
[52] U.S. Cl. .............................. 250/213 VT; 313/524
[58] Field of Search ................ 250/213 R, 213 VT; 313/524, 525, 528

[56] References Cited

U.S. PATENT DOCUMENTS

| | | | |
|---|---|---|---|
| 3,737,667 | 6/1973 | Babb et al. | 250/213 VT |
| 4,000,419 | 12/1976 | Crost et al. | 250/213 VT |
| 4,067,045 | 1/1975 | Provost et al. | 250/213 VT |

FOREIGN PATENT DOCUMENTS 2090012 6/1982 United Kingdom ......... 250/213 VT

*Primary Examiner*—David C. Nelms
*Assistant Examiner*—Crystal Cooper
*Attorney, Agent, or Firm*—Jerry W. Mills

[57] ABSTRACT

A method and apparatus for arranging primary optical apparatus to provide a high degree of adaptability to other vision equipment. The primary optical apparatus (10) includes a housing (90) with a number of cavities for holding optical components in alignment with respect to various optical paths. An image intensifier tube (114) is mounted in a cavity (112) disposed in a planar face (70) of the housing (90). The planar face (70) is adapted for mounting to a variety of other optical equipment. A collimator (115) is disposed in a housing cavity (113) and optically aligned between the tube (114) and a dual prism (128, 136). The optical images existing the prisms (128, 136) are redirected through turning mirrors (154, 158) and presented through eyepieces (92) to an observer.

21 Claims, 2 Drawing Sheets

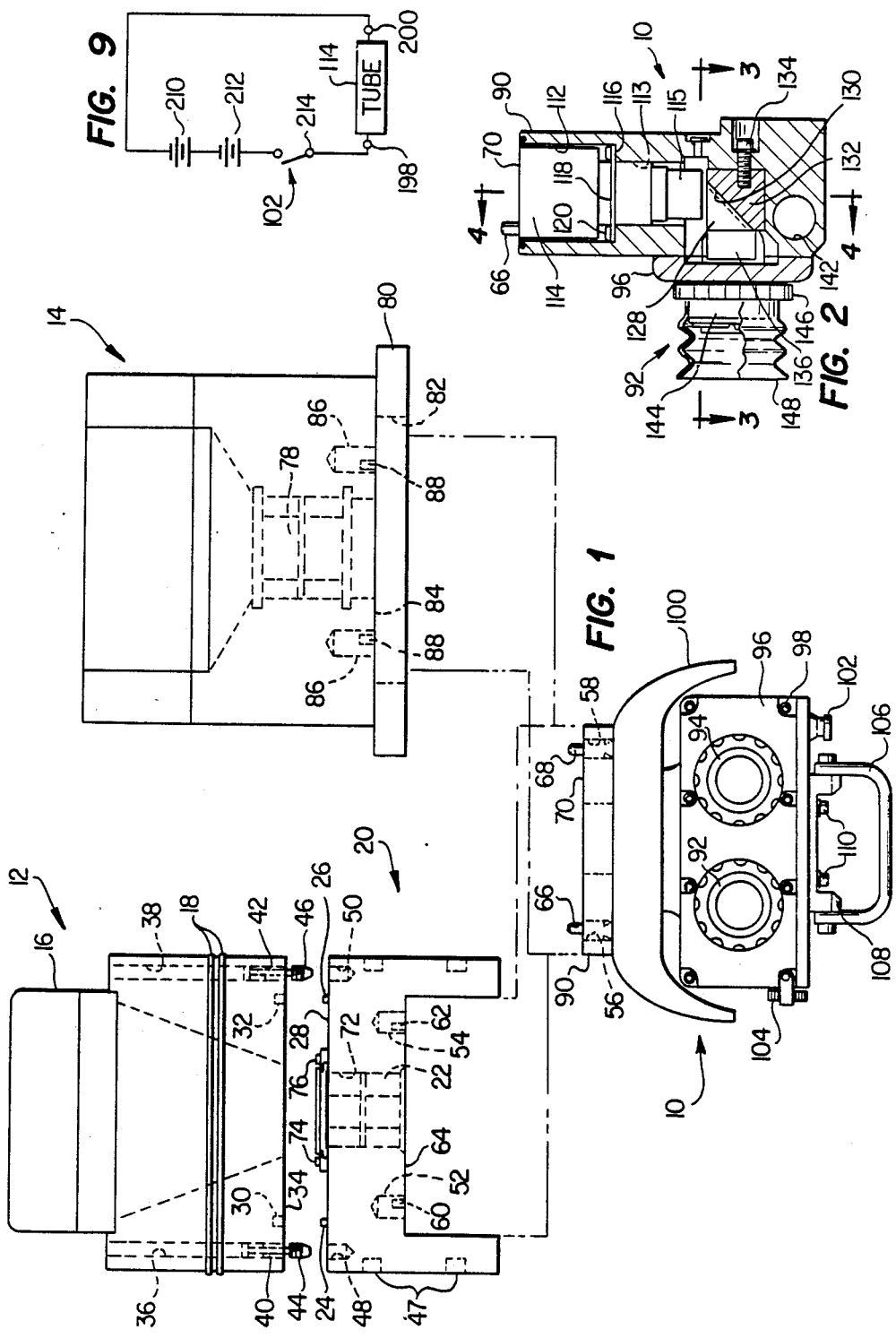

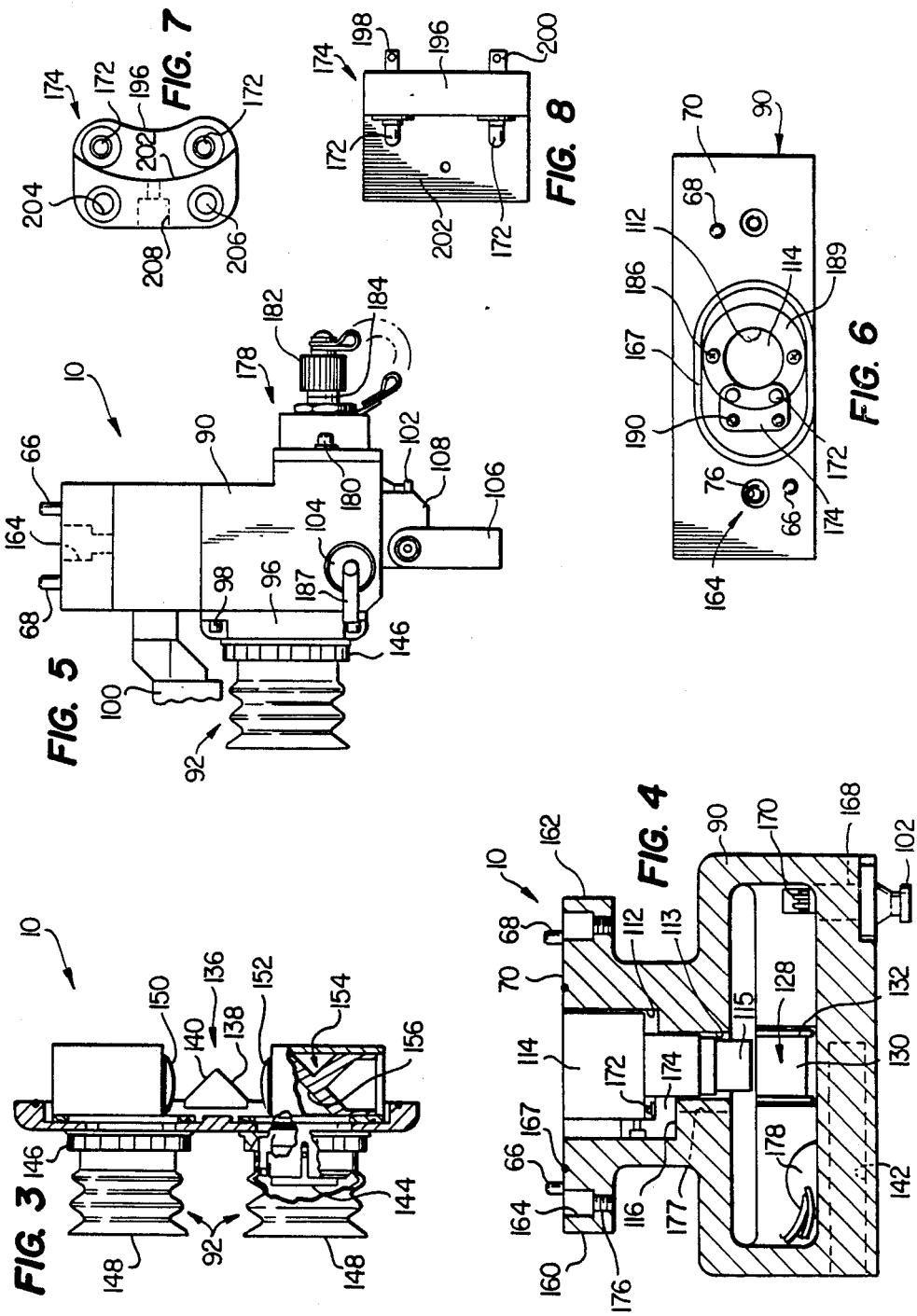

UNIVERSAL PASSIVE NIGHT VISION SYSTEM

TECHNICAL FIELD OF THE INVENTION

The present invention relates in general to vision equipment mounting apparatus, and more particularly relates to an arrangement and design for mounting hardware and vision equipment together to enhance interchangeability and universality of the various parts.

BACKGROUND OF THE INVENTION

There are many instances in which a single item of equipment can be used in different applications. Each application may require a particular nuance or variation of the equipment to satisfy particular needs. After a period of time in which the item of equipment is used and improved, it many times becomes modified or changed sufficiently such that its use becomes dedicated to the particular application. In this instance, the item of equipment is no longer universal due to the evolution of improvements.

Night vision equipment has undergone such an evolutionary development, particularly as used with armored vehicles, or the like. Because of the the diverse types of military armored vehicles which are available from many different manufacturers, there is required a corresponding variety of night vision equipment and mounting hardware required for the different types of vehicles. The adaptability of the noted vision equipment is further exacerbated when it is desired to retrofit the vision equipment to existing equipment which cannot be modified or is difficult to modify to accept such equipment.

Passive night vision equipment allows persons to view objects in the darkness by amplifying the faint light reflected from objects by the stars or the moon. Due to the complexity of night vision equipment, which includes various optical paths and precision lenses and mirrors, as well as a highly sophisticated and costly image amplifier tubes, the cost thereof is a major consideration in either retrofitting or originally equipping vehicles with night vision equipment. As can be appreciated, the adaption of a single type of night vision goggle to various applications is highly desirable over the use of plural different goggles for corresponding plural applications.

Night vision equipment utilized in connection with armored vehicles necessarily requires a periscope type of arrangement to enable a person inside the vehicle to view objects outside of the vehicle. Due to different characteristics of the armored vehicles, such as armor thickness, position of a vision equipment turret, etc., the periscope equipment required must also be different. Also, in armored vehicles having existing day vision periscope equipment, the constraints for adapting night vision equipment thereto are generally fixed or predetermined.

From the foregoing, it can be seen that a need exists for easily adapting costly night vision equipment to provide a high degree of flexibility for use with a variety of other equipment. There is an associated need to provide inexpensive adaptors for use with costly night vision equipment to enhance the universality of the equipment.

SUMMARY OF THE INVENTION

In accordance with the present invention, the disclosed night vision equipment and method substantially reduces or eliminates the disadvantages and shortcoming of the prior art techniques, devices and methods. According to the invention, the optical system is separated into a number of components so as to enhance the interchangeability thereof according to diverse applications. With enhanced interchangeability of components, the flexibility of the system is improved with respect to both the repair and inventory of the costly items.

The apparatus of the invention includes a primary optical assembly in a housing which is adapted for universal mounting to plural types of other optical equipment. The primary optical assembly includes a costly image intensifier tube, a collimator and lense, and mirror assembly for guiding an image along an optical path. Eyepiece equipment is also provided with the primary optical assembly for enabling a viewer to observe an object.

In one application of the invention, an adaptor is provided for interfacing the primary optical assembly to periscope optical equipment of a first type. The adaptor houses an objective lense assembly for processing an image light ray bundle transmitted therethrough from the periscope equipment to the primary optical assembly. When utilizing periscope equipment of a second type, which includes an integral objective lense assembly, the primary optical assembly is fastened directly to the second type of periscope equipment.

The adaptor is generally U-shaped having mounted in the center part thereof the objective lense assembly, and having opposing planar faces for mating between the respective first type of periscope equipment and the primary optical assembly. Depending arms of the adaptor include notches formed in the side edges thereof for allowing the assembled optical unit to be adjustably fixed in different elevated position in the armored vehicle through the use of spring-loaded pins.

The optical unit is thus sectioned and formed into component parts, with the expensive parts housed in an assembly which is constructed for universal mounting in different types of applications. Depending upon the specific applications, other less expensive assemblies or adaptors can be utilized to provide appropriate interfacing with different types of periscope equipment.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same parts throughout the views, and in which:

FIG. 1 is a front elevational view of a first an second type of application employing the interchangeable optical apparatus of the invention;

FIG. 2 is a sectional side view of the primary optical assembly housing, and internal components, constructed according to the invention;

FIG. 3 is a top sectional view of the primary optical assembly housing, taken along line 3—3 of FIG. 2, illustrating the various optical components therein;

FIG. 4 is a sectional view of the housing, taken along line 4—4 of FIG. 2, illustrating the construction thereof;

FIG. 5 is a side elevational view of the primary optical assembly;

FIG. 6 is top elevational view of the housing;

FIGS. 7 and 8 are respective top plan and side elevational views of the electrical connector for providing electrical power between a battery and the image intensifier tube; and FIG. 9 is a schematic illustration of the electrical circuit of the primary optical assembly.

DETAILED DESCRIPTION OF THE INVENTION

For purposes of example, the invention is illustrated for use with two particular types of military vehicle viewer heads. FIG. 1 illustrates a primary optical assembly 10 having night vision capabllities. The primary optical assembly 10 is adapted for use with a so-called "T" series viewer head 12, and a so-called "AMX-30" series viewer 14. The "T" series viewer head 12 is typically used in armored tanks having a 2.5 by 7 inch armor opening through which the viewer head 12 projects. In this manner, personnel within the tank can utilize the viewer head 12 with day vision or night vision apparatus to observe objects in the surrounding environment. The "AMX-30" viewer head 14 is adapted for use with other types of armored vehicles having an armor opening of about 3.5 by 8 inches. Both types of viewer heads 12 and 14 are conventionally available, and are currently used in connection with day vision apparatus. It should be understood that the principles and concepts of the invention can be applied to many other types of optical apparatus.

The "T" series viewer head 12 includes a prism housing 16 which holds a prism or other rfflective surface (not shown) for redirecting an object image entering the viewer head 12 from a horizontal path to a downwardly directed optical path. Also not shown is a window which covers an opening through which the object images enter the viewer head 12 and are reflected by the prism. The viewer head 12 is generally hollow so that there is an unobstructed optical image path which extends downwardly under the prism. A pair of rubber O-ring seals 18 functions as a gasket for sealing the viewer head 12 within the opening of the vehicle armor.

When the primary optical assembly 10 is utilized in connection with the "T" series viewer head 12, an objective lense assembly is required. Shown in FIG. 1 is an adaptor 20 which houses an objective lense 22, and which optically interfaces the primary optical assembly 10 to the "T" series viewer head 12. A pair of registration pins 24 and 26 mounted within a first interface surface 28 of the adaptor 20 are received in a corresponding pair of holes 30 and 32 formed on the bottom surface 34 of the viewer head 12. Alignment of the adaptor 20 to the viewer head 12 is thus provided. A pair of elongate holes 36 and 38, with threaded areas 40 and 42, are formed in the viewer head 12 for receiving a pair of screws 44 and 46. The screws 44 and 46 can be secured in threaded holes 48 and 50 formed in the adaptor 20. The adaptor includes recessed areas 47 on each side surface thereof for providing adjustable vertical positioning of the viewer head 12 within the armour opening. Spring loaded pin apparatus (not shown) fixed to the vehicle adjacent the armour opening is operative to engage the recessed areas 47 to hold the viewer head 12 in a desired vertical position.

The adaptor 20 includes another pair of threaded holes 52 and 54 for receiving a respective pair of mounting bolts (not shown) inserted through a pair of holes 56 and 58 formed in the primary optical assembly 10. A pair of registration holes 60 and 62 formed within a second interface surface 64 of the adaptor 20 each receive a respective registration pin 66 and 68 fastened within an interface surface 70 of the primary optical assembly 10. To be discussed in more detail below, the adaptor 20 further includes a cylindrical bore 72 for receiving and holding therein the objective lense assembly 22. The lense assembly 22 can be conventionally secured within the cavity 72 by a pair of screws 74 an 76.

The "AMX-30" series viewer head 14 includes similar optical equipment as the viewer head 12, but is of a different general size for use in different vehicles. The viewer head 14 also includes a prism (not shown) with an angled surface for redirecting an optical image, and an objective lense assembly 7B integral with the viewer head 14 and disposed in the optical path. A rubber seal 80 functions as a gasket for providing an environmental seal between the viewer head 14 and the armor of the vehicle. The seal 80 is rectangular in shape, with a central opening 82. The interface surface 70 of the primary optical assembly 10 fits flush against an interface surface 84 on the bottom side of the viewer head 14. As with the adaptor 20, threaded holes 86 and registration recesses 88 are formed in the bottom interface surface 84 of the viewer head 14 for aligning and securing thereto the primary optical assembly 10.

The primary optical assembly 10 includes a housing 90 for holding therein the optical apparatus in predefined optical paths for presenting an image through a pair of eyepieces 92 and 94 to a person using the optical unit. An access cove 96 is secured to the housing 90 by a number of screws 98. The access cover 96 can be removed to expsse the optical components held within the housing 90 for assembly or repair purposes. The access cover 96 is sealed to the housing 96 by a gasket (not shown) or other suitable sealing agent.

Mounted exterior to the housing 90 is a cushioned brow pad 100 for cushioning a person's forehead and steadying his head as he looks through the eyepieces 92 and 94. An off-on switch 102 is provided for controlling the electrical circuits and the image intensifier tube (not shown) mounted within the housing 90. A battery compartment cover 104 is removable to provide access to a battery compartment formed within the housing 90. A handle 106 is hinged to a bracket 108 which is secured by a pair of screws 110 to the housing 90. The composite optical unit with which the primary optical assembly 10 is utilized can be removed into the vehicle by withdrawing the entire unit by the handle 106. The composite optical unit can then be carried or otherwise manipulated by the handle 106.

FIG. 2 illustrates a cross-sectional view of the primary optical assembly 10 without the brow pad 100. As will be described in more detailed below, the primary optical assembly 10 is constructed to house the more expensive components of an optical unit, and in such a manner as to be readily adaptable to a variety of optical systems. The housing 90 includes the first large cavity 112 formed within the interface surface 70, and a second smaller cavity 113 formed in coaxial alignment with the first cavity 112. The cavities 112 and 113 are of such size and depth as to accommodate the expensive, and step-shaped image nntensifier tube 114.

Generation III image intensifier tubss 114 of the type employed with the primary optical assembly 10 may cost in the neighborhood of $3,000–$4,000. Because it is necessary to maintain the optical elements in close relationship within the optical path to control the object image, the image intensifier cavity 112 is located near the interface surface 70. This allows the primary optical assembly 10 to be fixed to other optical equipment and maintain the proximal relationship of the optical components. Thus, when used with either of tee viewer heads 12 and 14, the image intensifier tube 114 of the primary optical assembly 10 is fixed in an abutting and aligned relationship with the respective objective lenses 22 and 78.

Referring to FIGS. 2 and 4, the lower aart of the second cavity 113 is adapte for holding a collimator assembly 115. The cavities 112 and 113 are therefore stepped, forming a ledge 116 therebetween. The image intensifier tube 114 is fixed within the cavities 112 and 113 by a bracket 118 and a number of screws 120 secured to the ledge 116. The image intensifier tube 114, being fixed within the housing, also captures and fixes the collimator assembly 115 within the lower part of the cavity 113. A prism 128 is located below the collimator 115 for redirecting an optical image from a reflective surface 130 formed as part of the prism 128. The reflective surface 130 is angled at about 45° to redirect an image from a downwardly directed optical path to a rearwardly directed optica path. The prism 128 is fixed by an optical cement, or other suitable means, to a block 132. The block 132 is fixed to the housing 90 by a screw 134 which is also recessed within the front part of the housing 90.

Formed integral with the prism 128 is an additional prism 136 which is effective to split the image and redirect the individual images outwaddly. The prism 136 includes a pair of mirrored, or otherwise reflective surfaces 138 and 140 (FIG. 3), which are essentaally orthogonal to each other for splitting the image and redirecting the same in opposite directions. The prisms 128 and 136 can be fabricated as an integral unit by using a suitable optical cement. Thus, the fixation of the prism 128 by the block 132 and screw 134 also secures the prism 136 to the housing 90. An optical prism of the type noted is described in copending application, entitled "Triple Prism for Image Splitting", U.S. Pat. No. 4,737,023.

The housing 90 also includes a battery compartment 142 for holding a pair of "AA" size batteries. As noted in FIGS. 2 and 3, the access cover 96 provides a cover to the internal cavities of the housing 90, as well as provides a means for fixing the eyepiece assemblies 92 to the housing 90. The eyepiece assemblies 92 include a number of lenses, generally indicated as reference character 144, and a diopter adjustment 146 for providing interpupillary adjustments of the eyepieces 92. A flexible rubber eyecup 148 is attached to the diopter adjustment assembly 146 and allows a cushioned interface between the user's eyes and the primary optical assembly 10.

With reference to FIG. 3, a further cross section of the primary optical assembly 10 is shown. Illustrated is the prism 136 with reflective surfaces 13B and 140 for receiving from the reflective surface 130 an image and redirecting the optical image laterally outwardly. A pair of lenses 150 and 152 are disposed in the lateral optical paths to further clarify and process the images. Associated with lense 152 is a turning mirror 154 with an angled surface 156 for again redirecting the optical image in an orthogonal path toward the diopter lense 144. Reflective surfcce 156 can be a mirrored surface for redirecting the image from lense 152 to lense 144, and thus be presented to the viewer through the eyecup 148. A substantially identical turning mirror is associate with lense 150 for redirecting a different image through the other eyepiece assembly.

FIG. 4 is a cross-sectional view of the primary optical assembly housing 90, taken along line 4—4 of FIG. 2. The housing 90 includes a pair of outwardly directed flanges 160 and 162 for mounting of the assembly to other optical equipment. Each flange, for example flange 160, includes a stepped bore 164 therethrough with the smaller diameter bore 176 being threaded. With this arrangement, a screw having only its terminal end threaded and with a necked-down shank can be screwed through a portion of the stepped bore 164 and then secured into a corresponding threaded bore of the other optical equipment. However, when the primary optical assembly 10 is removed from the other optical equipment, the screws remain attached to the respective flange 160. A pair of registration pins, such as shown by 66 and 68, are also fixed within the interface surface 70 of the housing 90 for aligning the primary optical assembly 10 with the other optical apparatus.

A gasket 167, comprising an O-ring, rests within a recessed area which encircles the image intensifier tube cavity 112. The image intensifier tube 114 is thus sealed from the environment when the primary optical assembly 10 is fixed to other equipment through engagement by the interface surface 70.

With regard to the electrical apparatus of the primary optical assembly 10, the on-off switch 102 is mounted within a bore 168 of the housing 90. The switch 102 is of conventional rotary design for use in night vision equipment, in that the switch 102 is sealed to prevent air and moisture from entering the internal part of the housing 90. The switch 102 is of the type having internal switch contacts and a pair of terminal lugs 170 which are connected between a source of electrical power and the image intensifier tube 114 for controlling the application of power thereto. Dry cell batteries located in the battery compartment 142 provide one source of electrical power to the primary optical assembly 10. The switch contact terminals 170 are connected between a pair of image intensifier tube connector contacts 172 and the batteries to provide a series switched circuit. Connector contacts 172 in connector 174 provide an input and output electrical connection to the image intensifier tube 114. In addition, the connector contacts 172 are of the spring-loaded type which are depressed partially when the image intensifier tube 114 is installed within the cavities 112 and 113 of the housing 90. Connection wires are routed to the tube contacts 172 via the batteries and the switch 102 through a channel 177. The channel 177, is formed in the housing 90. An alternate electrical adaptor power assembly 178 is mounted to the front surface of the housing 90.

FIG. 5 illustrates the alternate power adaptor assembly 178. The adpptor assembly 178 is of conventional design, including a converter (not shown) for converting the voltages available in armored vehicles into other voltages which fall within the operating range of that required for the image intensifier tube 114. The adaptor assembly 178 is fixed to the housing 90 by securing screws 180. Again, the adaptor assembly 178 is hermetiaally sealed to the housing 90 to prevent an exchange of moisture or air between the environment and the internal parts of the primary optical assembly 10. The adaptor assembly 178 includes a cap 182 which can be threadably secured on an externally threaded tubular part 184 to protect electrical connection lugs housed therein. The battery compartment 142 includes the cap 104 wiich is tethered to the housing 90 by a flexible strap 187. The battery compartment cap 104 is spring-loaded to maintain pressure on the batteries to assure a suitable electrical connection therebetween, as well as to provide an isolated circuit from one end of the battery to the on/off switch terminll 170.

FIGURE 6 illustrates a top view of the housing 90, and particularly the planar interface surface 70. As noted above, the elastomer gasket 167 circumscribes the image intensifier tube cavity 112, thereby providing an environmental seal when the housing 90 is fixed to other optical equipment. The image intensifier tube 114 is shown fixed within its cavities 112 and 113 and secured therein by a pair screws 186 which pass through a flange 188 on the tube 114 and into the housing 90. Located under the tube flange 188 is the electrical connector 174 for effecting a switched electrical path from the batteries to the image intensifier tube 114. The tube connector 174 is fixed to the housing 90 by a pair screws, such as shown by reference character 190.

The tube connector 174 is shown in more detail in FIGS. 7 and B. The spring-loaded electrical contacts 172 are fixed within a case 196 formed of an electrical insulating material. The contacts 172 have solder lugs 198 and 200 extending through the bottomside of the case 196 for connection to conductors routed thereto from below. A vertical sidewall 202 is arcuate shaped for accommodating the image intensifier tube flange 188 when such tube is lowered into its respective cavities 112 and 113. A pair of holes 204 and 206 allow fasteners to be secured down therethrough into the housing 90, while another stepped bore 208 allows the tube connector contact assembly 174 to be pulled and fastened against a sidewall of the tube cavity. The undersurface of the tube flange 189 is provided with isolated contact areas which contact the spring-loaded contacts 172 of the connector 174.

FIG. 9 schematically illustrates the electrical circuit for switchably applying power to the image intensifier tube 114. A pair of batteries 210 and 212 are connected in series aiding between the switch 102 and the tube contact lug 200. The other tube contact lug 198 is connected to a switched terminal 214 associated with the switch 102. As can be seen, when switch 102 is closed to terminal 214, electrical power is applied to the image intensifier tube 114 by way of the contacts 198 and 200.

From the foregoing, a method and apparatus are disclosed for iimproving the versatility of optical apparatus, and particularly costly components thereof so as to be adaptable for use in a variety of applications. According to the invention, the parts of a night vision optical system have been arranged in a housing so that the necessary and expensive optical components can be used in conjunction with other optical equipment, or retrofit with existing optical equipment. Particularly, the optical components have been arranged within a housing to form a primary optical assembly which can be fixed to other optical equipment.

The optical components of the primary optical assembly comprise an image intensifier tube held aligned by the housing in an optical path with a collimator assembly. The image intensifier tube is mounted substantially flush with a planar interface surface of the housing to provide ready attachment of the housingtto the other optical equipment, and thus assure that the image intensifier tube is in close proximity with such other optical equipment.

The primary optical assembly further includes a pair prisms in the optical path of the collimator for redirecting an image in opposite directions. The oppositely directed images are guided along respective optical paths, and are rerouted orthogonally by respective turning mirrors. The individual images are then processed through correction lenses and presented to an observer through a pair eyepieces. Various electrical control circuits switchable connect battery or auxiliary power to the image intensifier tube.

While the preferred embodiment of the invention has been disclosed with reference to a specific structure and method thereof, it is to be understood that many changes in detail may be made as a matter of engineering choices without departing from the spirit and scope of the invention as defined by the appended claims.

What is claimed is:

1. Primary optical binocular viewing apparatus for use with other optical equipment, comprising:
    a housing having internal passages defining an optical path, said passages extending to a single opening in a surface of said housing, and said passages extending to a pair of openings in said housing;
    optical equipment, including a single image intensifier tube, fixed in one said passage to process and carry a single optical image input to the housing via said single opening, an image splitter for splitting the image output from said intensifier tube, and optical directing means for carrying the split images for output to respective said pair of openings in said housing;
    an external interface surface on said housing formed around said single opening, said interface surface being adapted for mounting to other equipment; and
    means for fixing said image intensifier with respect to said single opening at said interface surface.

2. The primary optical apparatus of claim 1 further including means for sealing said interface surface to said other optical equipment.

3. The primary optical apparatus of claim 1 wherein said interface surface is planar for providing flush non-rotatable mounting thereto of said other optical equipment, and further including registration means for aligning said planar interface surface with respect to said other optical equipment so as to fix said other optical equipment in only one position with respect to said primary optical apparatus, and means for fixing said other optical apparatus in said one position to said primary optical apparatus.

4. The primary optical apparatus of claim 1 further including an apertured mounting flange integral with said interface surface for fixing said primary optical apparatus to said other optical equipment.

5. The primary optical apparatus of claim 1 further including electrical connector means having spring-loaded contacts for connecting electrical power to said image intensifier tube.

6. The primary optical apparatus of claim 5 further including meansiin said housing for fixing therein said connector means such that said image intensifier tube can be lowered in one said passage and compress said connector to thereby establish an electrical connection to said image intensifier tube.

7. The primary optical apparatus of claim 6 wherein said housing is constructed so that when said primary optical apparatus is fixed to said other optical equipment said image intensifier tube is pressed against the spring-loaded contacts.

8. The primary optical apparatus of claim 1 further including a brow pad attached to said housing.

9. The primary optical apparatus of claim 1 further including means for supplying battery power to said image intensifier tube and alternate means for supplying power to said image intensifier tube in the absence of said battery power.

10. Night vision equipment adapted for universal use, comprising:
an eyepiece housing having an optical image input opening and an optical image output opening,
said housing further including an internal first cavity for housing a turning mirror and a lense assembly for rerouting an optical image in a circuitous path from said input opening to said output opening;
means interfacing said output opening to an eye of a user of said equipment;
an internal second and third chamber in said housing disposed in said optical path;
a collimator assembly and image intensifier tube disposed in said second and third chambers; and
said third chamber defining said input opening in an interface surface of said housing such that when said image intensifier tube is proximate said interface surface said night vision euipment can be adapted to other optical equipment 11. The vision equipment of claim 10 wherein said interface surface comprises a planar surface.

12. The vision equipment of claim 10 further including registration means for aligning said interface surface to said other optical equipment.

13. The vision equipment of claim 11 further including means for fastening said interface surface to said other optical equipment.

14. The vision equipment of claim 10 further including in combination an adaptor for housing an objective lenses assembly; and
means for fastening said adaptor to said interface surface of said housing so that said objective lense assembly is disposed in said optical path.

15. The vision equipment of claim 1 further including means for fastening said adaptor to said other optical equipment.

16. The vision equipment of claim 15 wherein said other vision equipment comprises periscope apparatus.

17. A method of constructing vision equipment for universality, comprising the steps of:
arranging an image intensifier tube, a collimator and an optical image directing means in said equipment so that said image intensifier tube is mounted adjacent an optical input of said vision equipment and such that said image intensifier tube is the first optical element in said equipment to process incoming images, and wherein said optical images are subsequently processed by said collimator and said image directing means for output to a viewer;
forming a universal interface on said first equipment for mounting to other types of vision equipment; and
forming said universal interface having said input opening therein.

18. The method of claim 17 further including attaching periscope type equipment to said universal interface.

19. The method of claim 18 further including fixing an objective lense assembly between said periscope equipment and said vision equipment.

20. The method of claim 17 further including forming an assembly attachable to said universal interface and fixing an objective lense assembly to said assembly.

21. The method of claim 18 further including forming an interface surface on said assembly for interfacing with other optical equipment.

* * * * *